(12) United States Patent
Hagiwara et al.

(10) Patent No.: US 7,652,696 B2
(45) Date of Patent: Jan. 26, 2010

(54) CCD SOLID-STATE IMAGE PICKUP DEVICE AND METHOD OF DRIVING THE SAME

(75) Inventors: Tatsuya Hagiwara, Miyagi (JP); Shunsuke Tanaka, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 334 days.

(21) Appl. No.: 11/826,960

(22) Filed: Jul. 19, 2007

(65) Prior Publication Data

US 2008/0018771 A1 Jan. 24, 2008

(30) Foreign Application Priority Data

Jul. 20, 2006 (JP) .......................... P2006-198303

(51) Int. Cl.
*H04N 5/217* (2006.01)
*H04N 3/14* (2006.01)

(52) U.S. Cl. ..................................... 348/241; 348/294

(58) Field of Classification Search .............. 348/222.1, 348/241, 294, 297, 303, 312, 316, 272, 273, 348/319; 257/231, 249, 250, 291, 292
See application file for complete search history.

(56) References Cited

U.S. PATENT DOCUMENTS

| 6,198,507 | B1 * | 3/2001 | Ishigami | 348/273 |
| 6,825,879 | B1 * | 11/2004 | Furumiya | 348/311 |
| 7,002,630 | B1 * | 2/2006 | Iizuka | 348/322 |
| 7,050,100 | B2 * | 5/2006 | Sakurai et al. | 348/312 |
| 7,079,184 | B2 * | 7/2006 | Yanai | 348/319 |
| 7,148,524 | B2 * | 12/2006 | Ozumi | 257/223 |
| 7,187,411 | B2 * | 3/2007 | Yamada | 348/314 |
| 7,336,306 | B2 * | 2/2008 | Oda | 348/272 |
| 7,362,366 | B2 * | 4/2008 | Egawa et al. | 348/308 |

FOREIGN PATENT DOCUMENTS

JP 2000-350099 A 12/2000

* cited by examiner

*Primary Examiner*—Tuan Ho
*Assistant Examiner*—Trung Diep
(74) *Attorney, Agent, or Firm*—Birch, Stewart, Kolasch & Birch, LLP

(57) ABSTRACT

A method of driving a CCD solid-state image pickup device, the device comprising: a plurality of vertical charge-transfer channels that vertically transfers signal charges responsive to amounts of light received; a signal-charge temporary accumulation section, provided at an end of each of the vertical charge-transfer channels, that is driven independently of driving of the vertical charge-transfer channels; and a horizontal charge-transfer channel through which signal charges transferred from the signal-charge temporary accumulation section are transferred to an output terminal side, wherein the method comprising performing vertical transfers of signal charges through the vertical charge-transfer channels during a period of a horizontal transfer of signal charges through the horizontal charge-transfer channel, while the horizontal transfer through the horizontal charge-transfer channel is brought to a temporary stop for each pulse-edge time of driving pulses to drive the vertical charge-transfer channels.

6 Claims, 3 Drawing Sheets

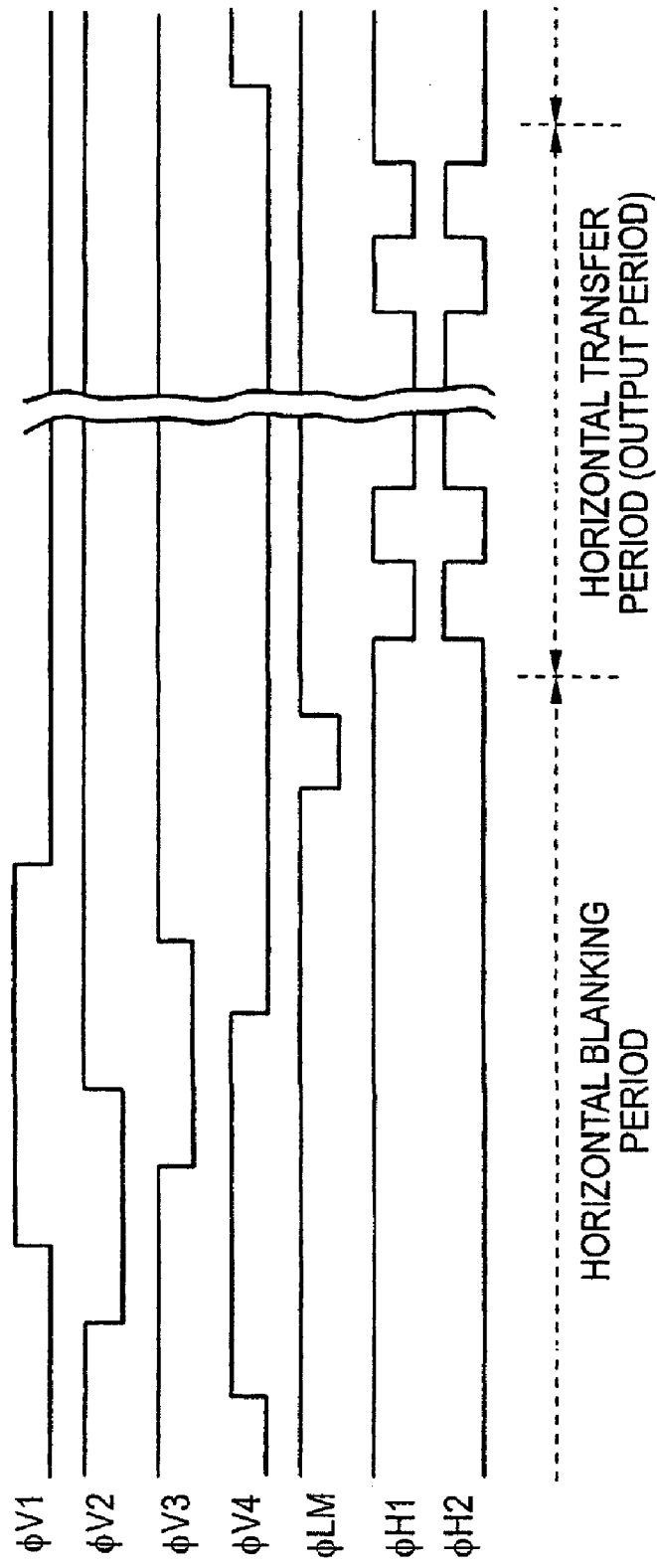

CCD SOLID-STATE IMAGE PICKUP DEVICE AND METHOD OF DRIVING THE SAME

BACKGROUND OF THE INVENTION

1. Field of the Invention

The present invention relates to a CCD (Charge Coupled Device) solid-state image pickup device and a method of driving such an image pickup device.

2. Description of the Related Art

A CCD solid-state image pickup device is, as described, e.g., in JP-A-2000-350099, provided with vertical charge-transfer channels (VCCDs) and a horizontal charge-transfer channel (HCCD), and configured so that signal charges read out from photodiodes (photoelectric conversion elements) formed in a two-dimensional, array on a semiconductor substrate surface to the vertical charge-transfer channels are transferred first to the horizontal charge-transfer channel along the vertical charge-transfer channels and then transferred into a charge detection section and an output amplifier along the horizontal charge-transfer channel, and the output amplifier puts out the signals of voltage values respectively responsive to amounts of the signal charges transferred into the charge detection section.

A timing chart showing the related-art transfer timing of signal charges is illustrated in FIG. 3. Transfers of signal charges in a vertical direction are performed by application of vertical transfer pulses $\phi V1$, $\phi V2$, $\phi V3$ and $\phi V4$ to vertical charge-transfer channels, and transfer of signal charges in a horizontal direction is performed by application of horizontal transfer pulses $\phi H1$ and $\phi H2$ to the horizontal charge-transfer channel.

When the vertical transfer pulses $\phi V1$, $\phi V2$, $\phi V3$ and $\phi V4$ are applied to each of the vertical charge-transfer channels, charges detected by photodiodes horizontally aligned in a row on a semiconductor substrate are each transferred vertically by one step, and accumulated on a line memory (LM) for buffer use which is provided between the end of each vertical charge-transfer channel and the horizontal charge-transfer channel.

And, when a driving pulse $\phi LM$ is applied to the line memory, the signal charges on the line memory are transferred to the horizontal charge-transfer channel. Then, two-phase driving pulses $\phi H1$ and $\phi H2$ are applied to the horizontal charge-transfer channel, all the signal charges on the horizontal charge-transfer channel are read out by the output amplifier, and thereafter the next row of signal charges are transferred in the vertical direction.

More specifically, each of image pickup devices hitherto known is configured so that the horizontal charge-transfer channel is driven during horizontal transfer periods (output periods) and the vertical charge-transfer channels and the line memory are driven during horizontal blanking periods when the driving of the horizontal charge-transfer channel is stopped. This is because, when the vertical charge-transfer channels are driven during the horizontal transfer periods (when rise timing and fall timing of vertical transfer pulses $\phi V1$, $\phi V2$, $\phi V3$ and $\phi V4$ overlap with the horizontal transfer periods), influence of noises develops on the output side.

In the related-art CCD solid-state image pickup devices, as mentioned above, vertical transfers are performed during periods not overlapping with horizontal transfer periods, and thereby mixing of noises is avoided. In other words, the related-art CCD solid-state image pickup devices have a problem that it is impossible to drive them at a high speed since vertical transfers cannot be performed during horizontal transfer periods.

SUMMARY OF THE INVENTION

Objects of the invention are to provide a CCD solid-state image pickup device which can avoid mixing of noises and ensures high-speed drive, and to provide a method of driving such an image pickup device.

According to an aspect of the present invention, there is provided a CCD solid-state image pickup device and the driving method thereof, wherein the device comprises: a plurality of vertical charge-transfer channels that vertically transfers signal charges responsive to amounts of light received; a signal-charge temporary accumulation section, provided at the end of each of the vertical charge-transfer channels, that is driven independently of driving of the vertical charge-transfer channels; and a horizontal charge-transfer channel through which signal charges transferred from the signal-charge temporary accumulation section are transferred to an output terminal side, and vertical transfers of signal charges through the vertical charge-transfer channels are performed during horizontal transfer periods of signal charges through a horizontal charge-transfer channel while horizontal transfer through the horizontal charge-transfer channel is brought to a temporary stop for each pulse-edge time of driving pulses to drive the vertical charge-transfer channels.

According to another aspect of the present invention, there is provided the present CCD solid-state image pickup device and the driving method thereof, wherein signal charges are transferred from the signal-charge temporary accumulation section to the horizontal charge-transfer channel during a horizontal blanking period provided between a time period over which the horizontal transfer is performed and a time period over which a subsequent horizontal transfer is performed.

According to another aspect of the present invention, there is provided the present CCD solid-state image pickup device and the driving method thereof, wherein the time period of the temporary stop is adjusted to a time period over which a transfer of at least 3 steps in the horizontal direction is performed.

BRIEF DESCRIPTION OF THE DRAWINGS

FIG. 3 is a drive timing chart of the related-art CCD solid-state image pickup device.

DETAILED DESCRIPTION OF THE INVENTION

An embodiment of the invention is illustrated below by reference to drawings.

Figure 1:
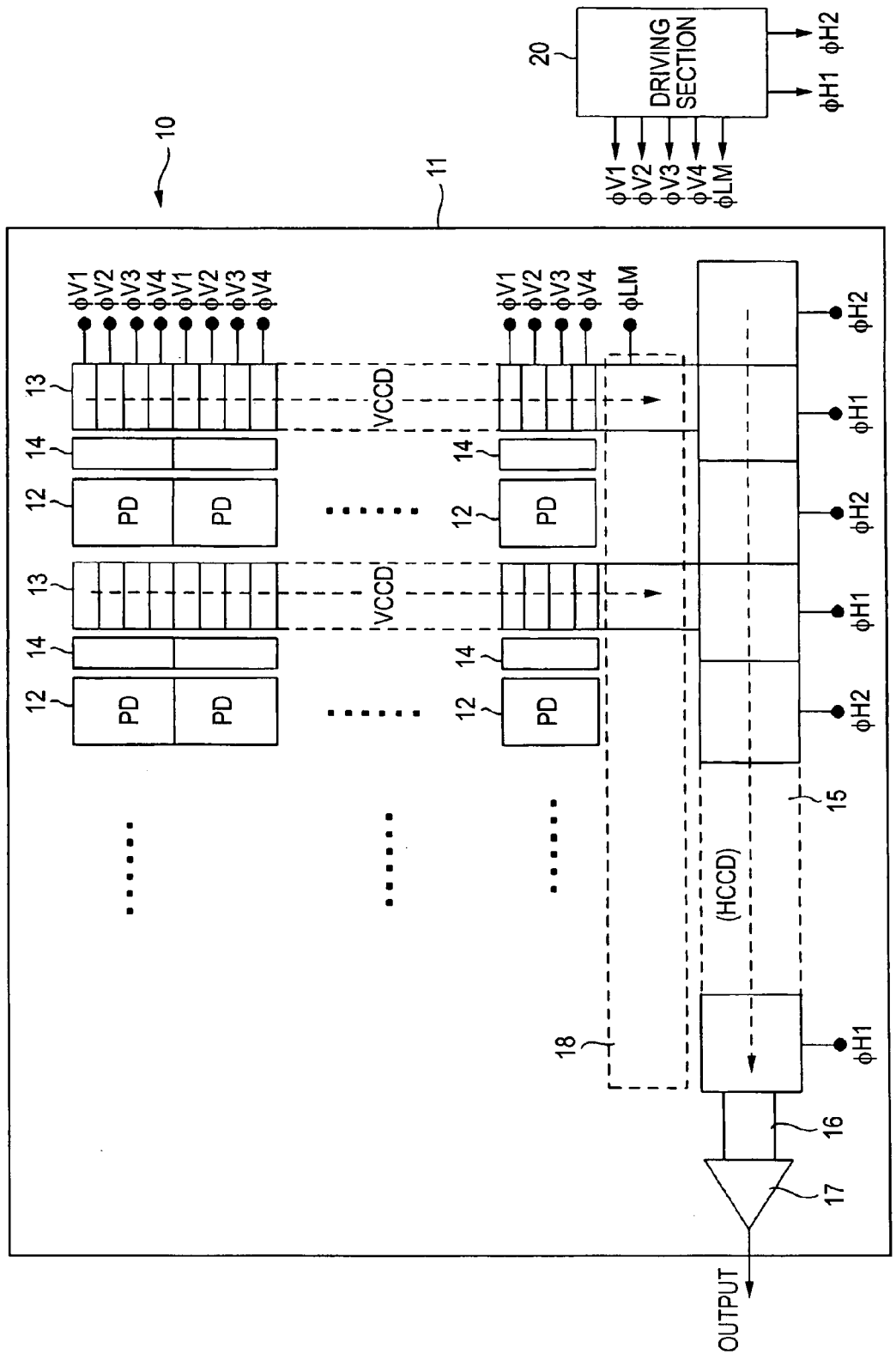
FIG. 1 is a schematic diagram of a CCD solid-state image pickup device relating to a mode for carrying out the invention.

FIG. 1 is a schematic diagram of a CCD solid-state image pickup device relating to a mode for carrying out the invention. The CCD solid-state image pickup device in a mode for carrying out the invention is provided with a CCD solid-state image pickup element 10 formed on a semiconductor substrate and a driving section 20 to put out drive timing pulses to the solid-state image pickup element 10.

The CCD solid-state image pickup element 10 is provided with a semiconductor substrate 11, a plurality of photodiodes (PDs) 12 formed in a two-dimensional array (specifically, a shape of tetragonal lattice in the diagram shown as an example) on the semiconductor substrate 11, vertical charge-transfer channels (VCCD) 13 formed on the side areas of photodiode columns respectively, and read-out gates 14 placed between each photodiode column 12 and each vertical charge-transfer channel 13. In the example shown diagrammatically, the element is so configured that (in the case of four-phase drive) each vertical charge-transfer channel 13 is provided with four vertical transfer electrodes per photodiode, and vertical transfer pulses φV1, φV2, φV3 and φV4 are applied to these four sheets of vertical transfer electrodes, respectively.

This CCD solid-state image pickup element 10 is further provided with a horizontal charge-transfer channel (HCCD) 15 placed in a lower area of the semiconductor substrate 11, a charge detection section 16 placed in an output part of the horizontal charge-transfer channel 15, and an output amplifier 17.

The horizontal charge-transfer channel 15 is configured so that (in the case of 2-phase drive) two sheets of horizontal transfer electrode films are provided per vertical charge-transfer channel, and horizontal transfer pulses φH1 and φH2 are applied to the two sheets of electrode films, respectively.

In addition, the CCD solid-state image pickup element 10 is, as in the case of the CCD solid-state image pickup element described in JP-A-2000-350099, provided with a line memory 18 for buffer use (a signal-charge temporary accumulation section) in a boundary area between the end of each vertical charge-transfer channel 13 and the horizontal charge-transfer channel 15, wherein the line memory receives signal charges transferred through each vertical charge-transfer channel 13 and accumulates them temporarily, and is driven with a timing different from the drive timing of the vertical charge-transfer channel 13.

The driving section 20 generates vertical transfer pulses φV1 to φV4, horizontal transfer pulses φH1 and φH2, a line memory driving pulse φLM and read-out pulses under instructions from an external CPU (e.g., a digital camera's control CPU) which is not shown in the schematic diagram, and put out these pulses to the CCD solid-state image pickup element 10.

Incidentally, though the terms "vertical" and "horizontal" are used in the foregoing descriptions, these terms merely signify "one direction" along a light-receiving plane of the solid-state image pickup element and "a direction almost orthogonal to this one direction", respectively.

In the thus configured CCD solid-state image pickup device, each photodiode 12 accumulates signal charge in an amount responsive to the quantity of light incident from an subject, and the signal charge is read from the photodiode 12 to an adjacent charge transfer channel 13 via a read-out gate 14 when a read-out pulse is applied from the driving section 20.

When vertical transfer pulses φV1 to φV4 are applied to each vertical charge-transfer channel 13, the signal charges are transferred in the direction to the horizontal charge-transfer channel 15, and a row of signal charges transferred to individual ends of vertical charge-transfer channels 13 are transferred to the line memory 18 and accumulated temporarily.

When a drive pulse φLM is applied to the line memory 18, the signal charges on the line memory 18 are transferred to the horizontal charge-transfer channel 15. By controlling the line memory, it becomes possible to perform pixel addition of signal charges in the horizontal direction.

When horizontal pulses φH1 and φH2 are applied to the horizontal charge-transfer channel 15, the signal charges are transferred along the horizontal charge-transfer channel 15 in the direction of the charge detection section 16. The pulse φH2 is a pulse standing in inversive relation with the pulse φH1, and signal charges stored in a potential packet formed under a sheet of some horizontal transfer electrode are transferred to another potential packet formed under an adjacent horizontal transfer electrode when the pulses φH1 and φH2 undergo inversion. In other words, one step of transfer in the horizontal direction is performed. When the pulses φH1 and φH2 undergo next inversion, next one step of transfer in the horizontal direction is performed.

An operation (a horizontal transfer period), in which transfer of signal charges in the horizontal direction is performed, a voltage value signal responsive to the amount of signal charges entered into the charge detection section 16 is put out from the output amplifier 17, the signal charges are disposed of and thereafter the next signal charges enter into the charge detection section 16, is repeated until signal charges on the horizontal charge-transfer channel 15 come to disappear. And a short-time horizontal blanking period is provided before the next horizontal transfer period starts.

Figure 2:
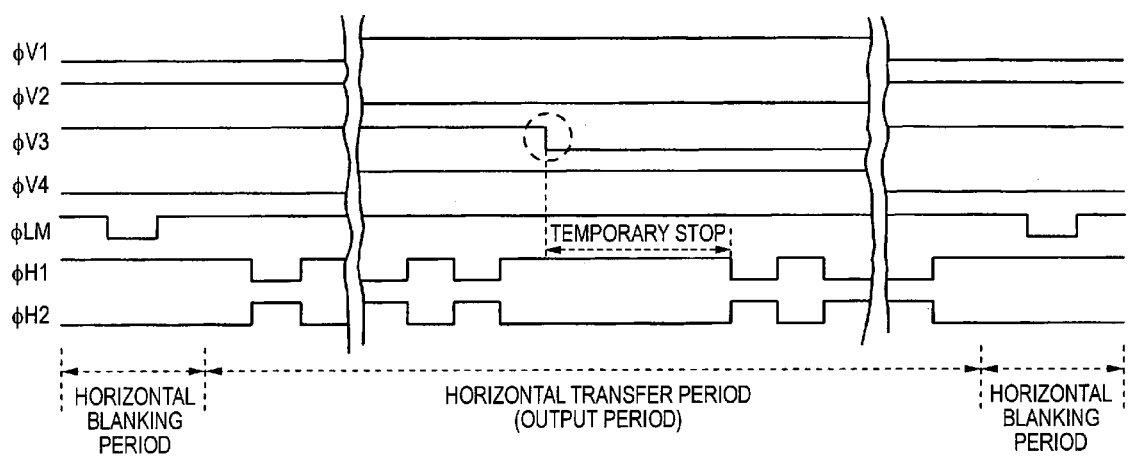
FIG. 2 is a drive timing chart of the CCD solid-state image pickup device shown in FIG. 1.

FIG. 2 is a timing chart of various driving pulses generated by the driving section 20 for driving the CCD solid-state image pickup element 10. In a mode for carrying out the invention, as with the related art shown in FIG. 3, horizontal transfer periods alternate with horizontal blanking periods.

However, the mode for carrying out the invention draws no distinction between a vertical transfer period and a horizontal transfer period, but it is so configured that vertical transfer is also performed during a horizontal transfer period. In other words, the vertical charge-transfer channels 13 and the horizontal charge-transfer channel are operating simultaneously. As a result, it becomes possible to drive the CCD solid-state image pickup element 10 at a high speed.

However, there is a fear of superimposition of noises upon output when vertical transfer is performed without limitation during a horizontal transfer period.

In the mode for carrying out the invention, therefore, horizontal transfer is made to stop temporarily only for a specified short period with both pulse rise timing and pulse fall timing of vertical transfer pulses. In order to reduce noises, it is required to stop temporarily at least one step of transfer in the direction of horizontal transfer. As represented graphically, it is preferable that three steps of transfer is stopped temporarily.

Although the pulse fall part of a vertical transfer pulse φV3 alone is shown in FIG. 2, the rise and fall of pulses φV1 to φV4 (pulse edges) in the case of subjecting each vertical charge-transfer channel to 4-phase drive are seen at a total of 8 points, so temporary stops are made at only these 8 points during each horizontal transfer period. In the case of 8-phase drive, temporary stops are made at a total of 16 points alone. By making these stops, a situation in which noises are superimposed on output can be avoided.

At the conclusion of each horizontal transfer period, the horizontal charge-transfer channel 15 is brought to a standstill (a horizontal blanking period), and during this horizontal-transfer standstill period the line memory 18 is driven and thereby signal charges to be transferred into the charge detection section 16 in the next horizontal transfer period are transferred from the line memory 18 to the horizontal charge-transfer channel 15. In the mode for carrying out the invention, the operation performed during the horizontal blanking period is only the drive of the line memory 18, so the horizontal blanking period can be shortened and high-speed drive of a CCD solid-state image pickup device can be achieved.

Since the transfer pulses φH1 and φH2 for the horizontal charge-transfer channel 15 are fast pulses, a delay time is within a fraction of a second even when 8- or 16-time temporary stops are made during each horizontal transfer period, so such temporary stops are no impediment to speedups.

In accordance with the mode for carrying out the invention, as mentioned above, high-speed drive is possible and pictorial data on captured images can be readout at a high speed from a CCD solid-state image pickup device having millions of pixels or more, and besides, superimposition of noises can be suppressed. Therefore, it becomes possible to read out pictorial data from high-quality captured images.

In accordance with the invention, horizontal transfer can be performed simultaneously with vertical transfers, and a horizontal blanking period can be shortened. Therefore, it becomes possible to perform high-speed drive. Furthermore, since the horizontal transfer is brought to a temporary stop at pulse-edge time of vertical transfer pulses, a situation in which noises are superimposed on output signals can be avoided.

The CCD solid-state image pickup device relating to the invention can be driven at a high speed, so it is useful in application to CCD solid-state image pickup devices aiming to multiply the number of pixels into millions or above.

The entire disclosure of each and every foreign patent application from which the benefit of foreign priority has been claimed in the present application is incorporated herein by reference, as if fully set forth.

What is claimed is:

1. A method of driving a CCD solid-state image pickup device,
    the device comprising:
    a plurality of vertical charge-transfer channels that vertically transfers signal charges responsive to amounts of light received;
    a signal-charge temporary accumulation section, provided at an end of each of the vertical charge-transfer channels, that is driven independently of driving of the vertical charge-transfer channels; and
    a horizontal charge-transfer channel through which signal charges transferred from the signal-charge temporary accumulation section are transferred to an output terminal side,
    wherein the method comprising performing vertical transfers of signal charges through the vertical charge-transfer channels during a period of a horizontal transfer of signal charges through the horizontal charge-transfer channel, while the horizontal transfer through the horizontal charge-transfer channel is brought to a temporary stop for each pulse-edge time of driving pulses to drive the vertical charge-transfer channels.

2. The method of driving the CCD solid-state image pickup device as described in claim 1,
    wherein signal charges are transferred from the signal-charge temporary accumulation section to the horizontal charge-transfer channel during a horizontal blanking period provided between a time period over which the horizontal transfer is performed and a time period over which a subsequent horizontal transfer is performed.

3. The method of driving the CCD solid-state image pickup device as described in claim 1,
    wherein a time period of the temporary stop is adjusted to a time period over which a transfer of at least 3 steps in the horizontal direction is performed.

4. A CCD solid-state image pickup device comprising:
    a plurality of vertical charge-transfer channels that vertically transfers signal charges responsive to amounts of light received;
    a signal-charge temporary accumulation section, provided at an end of each of the vertical charge-transfer channels, that is driven independently of driving of the vertical charge-transfer channels; and
    a horizontal charge-transfer channel through which signal charges transferred from the signal-charge temporary accumulation section are transferred to an output terminal side; and
    a driving unit that generates and puts out:
    vertical transfer pulses, by which vertical transfers of signal charges through the vertical charge-transfer channels are performed during a time period of horizontal transfer of signal charges through the horizontal charge-transfer channel; and
    horizontal transfer pulses for bringing a horizontal transfer through the horizontal charge-transfer channel to a temporary stop at each pulse-edge time of vertical transfer pulses to drive the vertical charge-transfer channels.

5. The CCD solid-state image pickup device as described in claim 4,
    wherein the driving unit transfers signal charges in the signal-charge temporary accumulation section into the horizontal charge-transfer channel by putting out a driving pulse to the signal-charge temporary accumulation section during a horizontal blanking period provided between a time period over which the horizontal transfer is performed and a time period over which a subsequent horizontal transfer is performed.

6. The CCD solid-state image pickup device as described in claim 4,
    wherein the driving unit performs the temporary stop by bringing a change in the horizontal transfer pulse to a stop just for a time period when a transfer of at least 3 steps in the horizontal direction is performed.

* * * * *